Patented Apr. 25, 1933

1,905,923

UNITED STATES PATENT OFFICE

FREDERICK H. MacLAREN, OF HAMMOND, INDIANA, ASSIGNOR TO STANDARD OIL COMPANY, OF WHITING, INDIANA, A CORPORATION OF INDIANA

WAX COMPOSITION

No Drawing.   Application filed March 13, 1929.  Serial No. 346,807.

The present invention relates to improved wax compositions and more particularly to such compositions having comparatively high melting points which retain a surface tackiness at ordinary temperatures, being in these properties similar to natural beeswax.

In carrying out the present invention I employ petroleum waxes, such as are obtained by the well known processes of diluting uncracked hydrocarbon residues or heavy uncracked petroleum distillates with suitable oil solvent diluent, such as ethylene dichloride or solvent naphtha and centrifuging or settling out the wax after chilling the diluted mixture, effecting substantially complete removal of oil.

In carrying out the present invention, to produce a wax of the character described, I mix a petrolatum having a melt-point between 120 and 135° F., with a petrolatum wax (melting point between 150 and 165° F.) and a small proportion, say from ½ to 5% of rosin. The proportions of the petrolatum and the petrolatum wax may vary, but in general I prefer that the substantially oil-free wax shall constitute at least 50% of the mixture. For example, a preferred composition in accordance with the present invention has the following composition:

|  | Per cent |
|---|---|
| 130 melt-point petrolatum | 20 |
| 163 to 165 melt-point petrolatum wax | 78 |
| Rosin | 2 |

It is readily apparent that in place of the mixture of low melt-point petrolatum and high melt-point petrolatum wax, I may employ any naturally occurring petrolatum wax material which contain the wax constituents, accompanied by greater or less quantities of oil, in the desired proportions or where such naturally occurring petrolatum mixture does not have the desired portions, I may modify it by adding the requisite quantities of either the high melt-point wax, or the low melting point petrolatum. It is also apparent that I may use as equivalents of the petrolatum waxes other hydrocarbon waxes having similar physical and structural characteristics, such as purified rod wax, or slop wax. In place of rosin I may use other similar natural or synthetic resinous materials.

I claim:

1. A normally tacky, high melt-point wax mixture constituting principally of hydrocarbon waxes, said mixture comprising high melting point petrolatum wax, and lower melting point petrolatum, at least half of its wax content being high melt-point petrolatum wax, and ½ to 5% of rosin.

2. A normally tacky, high melt-point wax mixture consisting principally of hydrocarbon waxes, said mixture comprising 120° F. to 135° F. melt-point petrolatum and 150° F. to 165° F. melt-point petrolatum wax, the latter constituting at least one-half of the wax content, and ½ to 5% of rosin.

3. A normally tacky, high melt-point wax mixture consisting principally of hydrocarbon waxes, said mixture comprising 20% of 130° F. melt-point petrolatum, 78% of 163–165° F. melt-point petrolatum wax and 2% rosin.

FREDERICK H. MacLAREN.